United States Patent [19]

Wiedeman

[11] Patent Number: 5,758,260
[45] Date of Patent: May 26, 1998

[54] SATELLITE BEAM STEERING REFERENCE USING TERRESTRIAL BEAM STEERING TERMINALS

[75] Inventor: Robert A. Wiedeman, Los Altos, Calif.

[73] Assignee: Globalstar L.P., San Jose, Calif.

[21] Appl. No.: 518,524

[22] Filed: Aug. 23, 1995

[51] Int. Cl.$^6$ .................................................. H04B 7/185
[52] U.S. Cl. .................. 455/12.1; 244/164; 342/354; 342/355; 342/358; 364/454
[58] Field of Search ................... 455/12.1, 13.1, 455/13.4; 244/164; 342/352, 353, 354, 355, 357, 358, 359, 368; 364/434

[56] References Cited

U.S. PATENT DOCUMENTS

| | | | |
|---|---|---|---|
| Re. 32,905 | 4/1989 | Baran | 370/104 |
| 4,567,485 | 1/1986 | Oshima et al. | 342/358 |
| 4,599,619 | 7/1986 | Keigler et al. | 342/352 |
| 4,630,058 | 12/1986 | Brown | 342/359 |
| 4,901,307 | 2/1990 | Gilhousen et al. | 370/18 |
| 4,910,524 | 3/1990 | Young et al. | 342/354 |
| 4,910,792 | 3/1990 | Takahata et al. | 455/12.1 |
| 5,010,317 | 4/1991 | Schwendeman et al. | 340/311.1 |
| 5,070,338 | 12/1991 | Cohen | 342/355 |
| 5,073,900 | 12/1991 | Mallinckrodt | 375/1 |
| 5,081,703 | 1/1992 | Lee | 455/13 |
| 5,109,390 | 4/1992 | Gilhousen et al. | 375/1 |
| 5,119,225 | 6/1992 | Grant et al. | 359/172 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,303,286 | 4/1994 | Wiedeman | 379/59 |
| 5,339,330 | 8/1994 | Mallinckrodt | 375/1 |
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |

FOREIGN PATENT DOCUMENTS

| | | |
|---|---|---|
| 0 421 698 A3 | 10/1991 | European Pat. Off. |
| WO 90/13186 | 11/1990 | WIPO |
| WO 91/09473 | 6/1991 | WIPO |

OTHER PUBLICATIONS

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

(List continued on next page.)

*Primary Examiner*—Chi H. Pham
*Attorney, Agent, or Firm*—Perman & Green

[57] ABSTRACT

A satellite communication system has at least one satellite (1) with an antenna that generates a moving beam pattern on the surface of the earth. The beam pattern (3) is comprised of a plurality of sub-beams (4). A method of this invention determines an attitude correction signal for the satellite by the steps of: (a) providing at least one reference transmitter (10) at a known location on the surface of the earth; (b) transmitting at least one signal from the at least reference transmitter into at least one of the sub-beams; (c) receiving the at least one signal with the satellite antenna and transponding the received at least one signal to a ground station (8). A next step of the method (d) receives the transponded at least one signal with the ground station; (e) determines a gain of the received at least one signal; (f) compares the determined gain to a gain expected to be received based on a predetermined knowledge of a spatial variation in gain of the satellite antenna; and (g) and determines a difference between the determined gain and the expected gain to derive a correction signal indicative of an attitude error of the satellite. The method further includes the steps of transmitting the correction signal to the satellite; and correcting the attitude of the satellite in accordance with the correction signal.

38 Claims, 8 Drawing Sheets

OTHER PUBLICATIONS

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey$^{SM}$ before the FCC, Washington, D.C. 20554, May 31, 1991 pp. 33–51.

Application of Ellipsat Corporation ELLIPSAT for the Authority to Construct Ellipso® 1 An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Transactions, vol. E 74, No. 8 Aug. 1991, pp. 2201–2210.

"Digital Network Oriented Mobile Radio Satellite System as an Intregrated Part of The GSM Cellular Radio System in Europe", P. Dondl, Deutsch BUndespost/Fernmeldetechniches Zentralmt/Darmstadt, Sep. 21, 1989 Fed. Rep. Germ.

"The OmniTRACS® Mobile Satellite Communications and Positioning System", E. Tiedemann, Jr. et al., Vehicle Electronics in the 90's: Proceedings of the In'l. Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium ™[1] System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

SATELLITE BEAM STEERING REFERENCE USING TERRESTRIAL BEAM STEERING TERMINALS

FIELD OF THE INVENTION

This invention relates in general to satellite systems and, in particular, to a mobile communications satellite system using low earth orbit (LEO) satellites.

BACKGROUND OF THE INVENTION

LEO satellites suitable for use in a mobile communications satellite system have Radio Frequency (RF) communications coverage areas, corresponding to antenna patterns (footprints), which sweep across the earth in the direction of the satellite's orbital path. Generally, it is important to accurately point the satellite in a given direction in order to orient the satellite antenna pattern beam or beams on the surface of the earth.

In most cases there are three directions that govern a satellite in flight. By accepted convention, these directions conform to typical "aircraft" coordinates. FIG. 1 shows these three directions as a roll axis direction, a pitch axis direction, and a yaw axis direction. The roll axis is pointed in the direction of the satellite velocity vector and is in the plane of the orbit. The pitch axis is perpendicular to the roll axis and to the orbit plane. The yaw axis is perpendicular to each of the roll and pitch axes and is in the plane of the orbit.

A satellite is nominally pointed with its yaw axis directed toward the center of the earth. The coverage area of the communications beam, if the antenna is fixed to the body of the satellite, or the antenna gimble point if the antenna is steered, can be directed either in the direction of the satellite's velocity vector (or away from the velocity vector) by pitching the satellite. This is accomplished by rotating the satellite about its pitch axis. Likewise, the beam can be steered perpendicular to the velocity vector by rolling the satellite, i.e., by rotating the satellite about the roll axis. Finally, the satellite beam may be steered in rotation by rotating the satellite about its yaw axis.

Generally, commands are issued to the satellite's attitude control system to perform these rotations. The attitude control system is used to maintain the satellite pointed in a particular direction by controlling the satellite's attitude with respect to the various axes and thus point the antenna pattern beam or beam(s) in a desired direction relative to the surface of the earth (or a desired direction in space). LEO satellites move in space and time with the antenna beam on the ground sweeping along with the satellite, alternatively covering and uncovering areas on the ground.

LEO satellites may have the antenna roll, pitch and yaw axes fixed, and thus move a beam pattern over the surface of the earth. A sub-satellite point (SSP) is a point on the surface of the earth at which the yaw axis is pointed, and is located along a vector from the earth's center to the point on the orbit where the satellite is located. The SSP is defined to be at the intersection of this line and the earth's surface.

The antenna m from a LEO satellite can be analogized as a push broom, where the yaw axis is the broom's handle and where the satellite's coverage area, that is, a region illuminated by the beam, is pushed over the earth's surface. The portion of the earth's surface that can be seen from the orbiting LEO satellite at any instant is its coverage footprint. The antenna beam may be all or some portion of the footprint. The coverage area has a size and shape which typically depends on the altitude of the orbit and the elevation angle to the satellite from the extremity of the coverage area footprint. The antenna beam does not necessarily need to be regular in shape, nor does it have to illuminate all of the coverage area. However, for the purposes of this discussion it is assumed that the coverage area is a circular area centered on the SSP. The satellite beam is typically divided into smaller sub-beams for communications efficiency. It is this set of sub-beams that usually require a preferential direction to be specified.

Furthermore, for this discussion it is assumed that the antenna is fixed to the body of the satellite. However, this is not necessary, and the antenna can instead be gimbled and directed to point in some direction with respect to the satellite axes. In this case instrumentation on the gimble axes (either single or two axes) provides offset information to the satellite or ground control for the determination of the attitude of the satellite.

The satellite system requires reference information in order to maintain a preferential satellite direction with respect to the yaw axis (and other axes) for the antenna beam as it moves over the earth. The attitude control system on-board the satellite performs this function. It can use any of a number of conventional control methods to orient the satellite in the preferred direction. In order to perform the attitude control function reference information is required to determine the satellite's attitude and to therefore determine and send commands to the attitude control system so as to change the pointing direction of the satellite or antenna that is creating the coverage area on the ground. This reference information has conventionally been obtained by earth sensors, sun sensors, magnetometers, and other external reference devices.

Recent advances in communication, computer, and small satellite technology has made feasible a satellite communications system that employs a constellation of LEO satellites in conjunction with fixed, mobile and handheld user terminals. For such a system to operate at peak efficiency it can be appreciated that it is desirable to provide an improved method for controlling the attitude of individual ones of the LEO satellites.

OBJECTS OF THE INVENTION

It is a first object of this invention to provide satellite attitude control reference information from either users of the system or from fixed reference transmitters having known locations on the earth's surface.

It is a further object of this invention to provide a satellite attitude control system that compares the gains of signals received from one or more reference transmitters, positioned at known locations on the earth's surface, with expected gains as indicated by a stored map of satellite antenna gain contours, and that then determines an attitude correction from a difference in the received and expected gains.

SUMMARY OF THE INVENTION

The foregoing and other problems are overcome and the objects of the invention are realized by methods and apparatus for determining an attitude correction signal for a satellite. A satellite communication system has at least one satellite with an antenna that generates a moving beam pattern on the surface of the earth. The beam pattern is comprised of a plurality of sub-beams. A method of this invention determines an attitude correction signal for the satellite by the steps of: (a) providing at least one reference transmitter at a known location on the surface of the earth; (b) transmitting at least one signal from the at least reference transmitter into at least one of the sub-beams; (c) receiving the at least one signal with the satellite antenna and transponding the received at least one signal to a ground station. A next step of the method (d) receives the transponded at least one signal with the ground station; (e) determines a gain of the received at least one signal; (f) compares the determined gain to a gain expected to be received based on a predetermined knowledge of a spatial variation in gain of the satellite antenna; and (g) and determines a difference between the determined gain and the expected gain to derive a correction signal indicative of an attitude error of the satellite.

The method further comprises the steps of transmitting the correction signal to the satellite; and correcting the attitude of the satellite in accordance with the correction signal.

The step of transmitting at least one signal from the at least reference transmitter can include a step of transmitting a plurality of signals from one reference transmitter; a step of transmitting a plurality of signals from a plurality of reference transmitters; or a step of transmitting one signal from individual ones of a plurality of reference transmitters.

The satellite has a preferred direction of travel and a preferred orientation in space at any given point in time. Although the teaching of this invention is illustrated primarily in the context of yaw axis control, it should be realized that the teaching of this invention applies to all axes of orientation.

The satellite has a preferred yaw angle with respect to the direction of travel over the surface of the earth, and a yaw error angle exists such that the satellite's actual direction differs from the preferred direction. In this case the step of determining determines an apparent direction of travel that differs from the actual direction of travel by an angle related to a knowledge uncertainty as to the satellite attitude. For the case where the correction signal has a value that is a function of the yaw error angle of the satellite, the method further includes the steps of transmitting the correction signal to the satellite; and correcting the attitude of the satellite in accordance with the correction signal by rotating the satellite about the yaw axis so as to reduce a magnitude of the yaw error angle.

In a presently preferred, but not limiting, embodiment of this invention the signals are transmitted, transponded and received as spread spectrum, code division multiple access signals.

BRIEF DESCRIPTION OF THE DRAWINGS

The above set forth and other features of the invention are made more apparent in the ensuing Detailed Description of the Invention, when read in conjunction with the attached Drawings, wherein.

DETAILED DESCRIPTION OF THE INVENTION

It is noted at the outset that, although the ensuing description is made primarily in the context of a yaw axis steering reference, the teaching of this invention is also applicable in general to steering about other axes. For example, two axis control can be accomplished in accordance with this invention, and full three axis control can be accomplished with a suitable sensor, such as a sun sensor, a magnetometer, or other suitable means.

Figure 2:
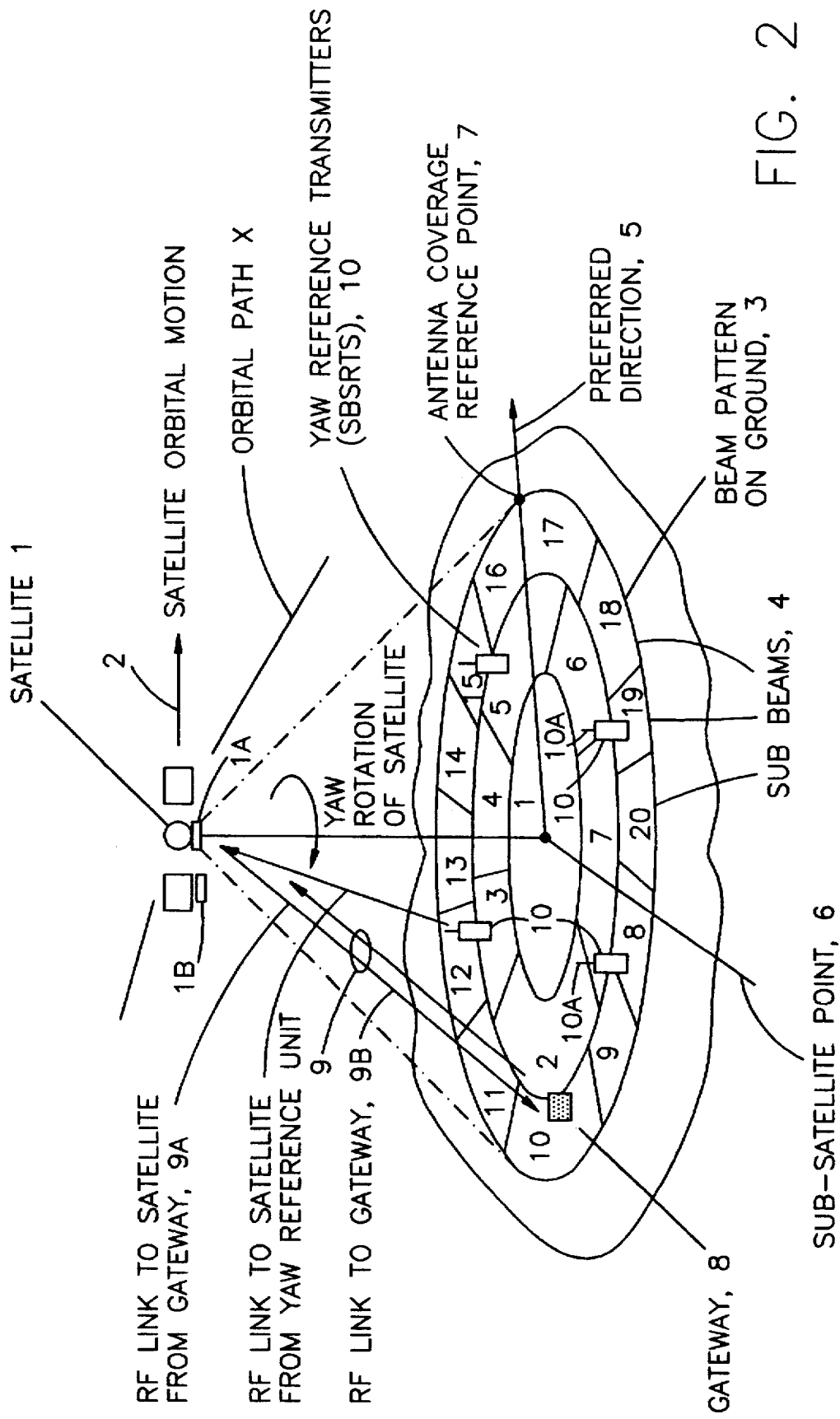
FIG. 2 illustrates, in accordance with the teaching of this invention, a satellite having a beam comprised of sub-beams, and the use of terrestrial yaw reference transmitters, also referred to herein as satellite beam steering reference terminals (SBSRTs), that are located at known locations on the earth's surface.

Referring now to FIG. 2, a satellite 1 is in motion along the satellite velocity vector 2 along an orbital path x and thus moves a coverage area 3 along the ground. The coverage area 3 corresponds to a satellite beam that is typically divided, by example, into some number of concentrically arranged sub-beams 4, such as 20 sub-beams.

The sub-beams are generally required to point in a preferential or preferred direction 5 with respect to the yaw axis. The preferred direction 5 may vary with time and may rotate at some specified rate.

The satellite 1 is assumed to be controlled around the yaw axis, which is defined as a line between the center of the earth and the satellite. The intersection of this line with the earth's surface is referred to herein as the satellite's sub-satellite point (SSP) 6. The preferred direction 5 is a vector extending from the SSP 6 to a point 7 on the outer edge of the satellite antenna coverage region 3, or to any other convenient point. It is not necessary for the beam to be centered on the SSP 6, and can instead be at an arbitrary angle to the SSP 6 and can cover less than the entire coverage area footprint area of the satellite.

At least one terrestrial gateway (GW) 8 is bidirectionally coupled to the satellite 1 through an RF link or feeder link 9 comprised of an RF uplink 9a, to a satellite feeder link receive antenna 1a, and an RF downlink 9b, from a satellite transmit antenna 1b.

In accordance with this invention there is provided at least one and preferably a plurality of yaw reference transmitters, also referred to herein as satellite beam steering reference terminals (SBSRTs) 10, that are positioned at known locations (latitude and longitude) of the earth's surface. Each SBSRT 10 includes an antenna 10a, such as an omnidirectional antenna, and is capable of transmitting a signal to the satellite 1, and may also be capable of also receiving a signal from the satellite 1. The SBSRTs 10 communication via second RF links (not feeder links) with the satellite 1.

In a presently preferred, but certainly not limiting, embodiment of this invention, there are a total of 48 satellites in, by example, a 1414 km Low Earth Orbit (LEO). The satellites are distributed in eight orbital planes with six equally-spaced satellites per plane (Walker constellation). The orbital planes are inclined at 52 degrees with respect to the equator and each satellite completes an orbit once every 114 minutes. This approach provides approximately fullearth coverage with, preferably, at least two satellites in view at any given time from a particular user location between about 70 degree south latitude and about 70 degree north latitude. As such, a user is enabled to communicate to or from nearly any point on the earth's surface within a gateway 8 coverage area to or from other points on the earth's surface via one or more GWs 8 (by way of a public switched telephone network (PSTN) connection to the GW 8) and one or more of the satellites 1.

Reference in this regard may be had to U.S. Pat. No. 5,422,647, by E. Hirshfield and C. A. Tsao, entitled "Mobile Communications Satellite Payload", which discloses one type of communications satellite having linear amplifiers and phased array transmit and receive antennas. The described satellite payload is suitable for use with the teaching of this invention, as well as other satellite transponder types.

User/gateway communications are accomplished via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed. However, Time Division Multiple Access (TDMA) may also be used, such as by time sequencing the transmissions of the signals and by applying correction methods to achieve a near-real time approximation of the teachings described herein. Frequency Division Multiple Access (FDMA) can also be employed, as can combinations of these various access techniques.

The low earth orbits of the satellites 1 permit low-powered fixed or mobile user terminals to communicate via the satellites 1, each of which functions, in a presently preferred embodiment of this invention, solely as a "bent pipe" repeater to receive a communications traffic signal (such as speech and/or data) from a user terminal or from a gateway 8, to convert the received communications traffic signal to another frequency band, and to then re-transmit the converted signal. However, it should be realized that the teaching of this invention is not limited to "bent pipe" repeater satellites, and can function equally well with on-board processing and regenerative repeater types of satellites. There need be no direct communication link or links between the satellites 1.

The user terminals, and also the SBSRT 10, communicate via, by example, L-band RF links (uplink or return link) and S-band RF links (downlink or forward link) through return and forward satellite transponders (shown in FIG. 6), respectively. The return L-band RF links may operate within a frequency range of 1.61 GHz to 1.625 GHz, a bandwidth of 16.5 MHz, and are modulated with in accordance with the preferred spread spectrum technique in multiple 1.25 MHz segments. The forward S-band RF links may operate within a frequency range of 2.485 GHz to 2.5 GHz, a bandwidth of 16.5 MHz, and are also modulated in accordance with the spread spectrum technique in multiple 1.25 MHz segments.

The 16.5 MHz bandwidth of the forward link is partitioned into 13 channels with, by example, up to 128 users being assigned per channel. The return link may have various bandwidths, and a given user terminal may or may not be assigned a different channel than the channel assigned on the forward link.

The gateway 8 communicates with the satellites 1 via, by example, a full duplex RF link 9 (forward link 9a (to the satellite), return link 9b (from the satellite)) that operates within a range of frequencies generally above 3 GHz and preferably in the C-band. The C-band RF links bidirectionally convey the communication feeder links, and also convey satellite commands to the satellites and telemetry information from the satellites. The forward feeder link 9a may operate in the band of 5 GHz to 5.25 GHz, while the return feeder link 9b may operate in the band of 6.875 GHz to 7.075 GHz.

Figure 3:
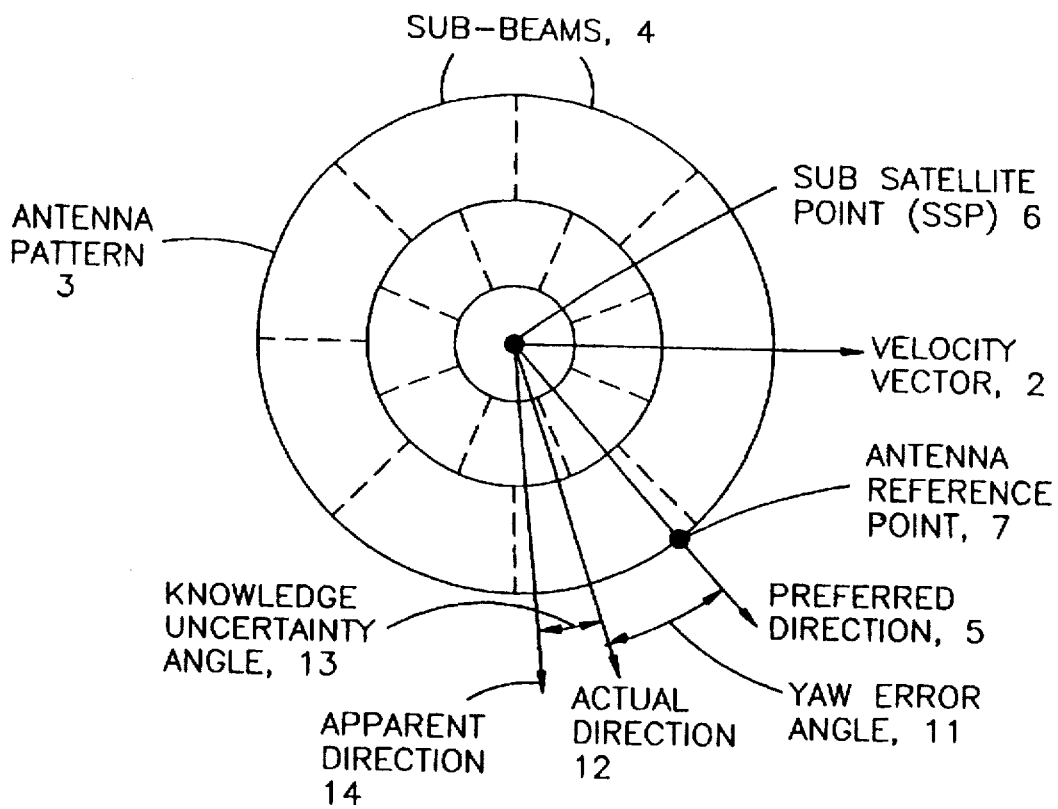
FIG. 3 is view looking down at the earth's surface from the satellite, and illustrates the angular relationships between a satellite velocity vector, a preferred direction, an actual direction, and an apparent direction, all of which may be referenced to the sub-satellite point (SSP)

Having described a presently preferred, but not limiting, embodiment of a communications system within which the teaching of this invention may be used to advantage, reference is now made to FIG. 3 for illustrating an exemplary antenna pattern 3 of sub-beams 4 centered on the SSP 6. The satellite antenna pattern 3 is moving as the satellite 1 moves along the velocity vector 2, alternatively covering and uncovering points on the ground. The pattern has the preferred direction 5 with respect to the velocity vector 2, and at any time may be fixed or rotating at some rate.

The accuracy of beam pointing has two components. A first component is the error angle 11, which in this embodiment of the invention is a yaw error. The yaw error is the difference between the preferred direction 5 and the actual direction 12 that the beam is moving. The second component is a knowledge uncertainty angle 13, that is, the uncertainty in knowledge of the actual direction. The knowledge uncertainty gives rise to an "apparent" direction 14 of satellite beam pattern motion over the surface of the earth. If no yaw axis control is performed, the yaw error angle 11 will change with time. Considering various effects and perturbations due to orbital dynamics, thermal effects, drag, mechanical forces and other factors, the yaw error angle 11 may oscillate, may remain constant with offset, or may rotate in either direction about the SSP 6.

A satellite attitude controller 1c (FIG. 10) is used to maneuver the satellite 1 in order to point the antenna, by example, in the preferred direction 5, thus minimizing the beam positioning error 11 (for the example case, the yaw error), using values and information that are obtained in accordance with the teaching of this invention.

Figure 4:
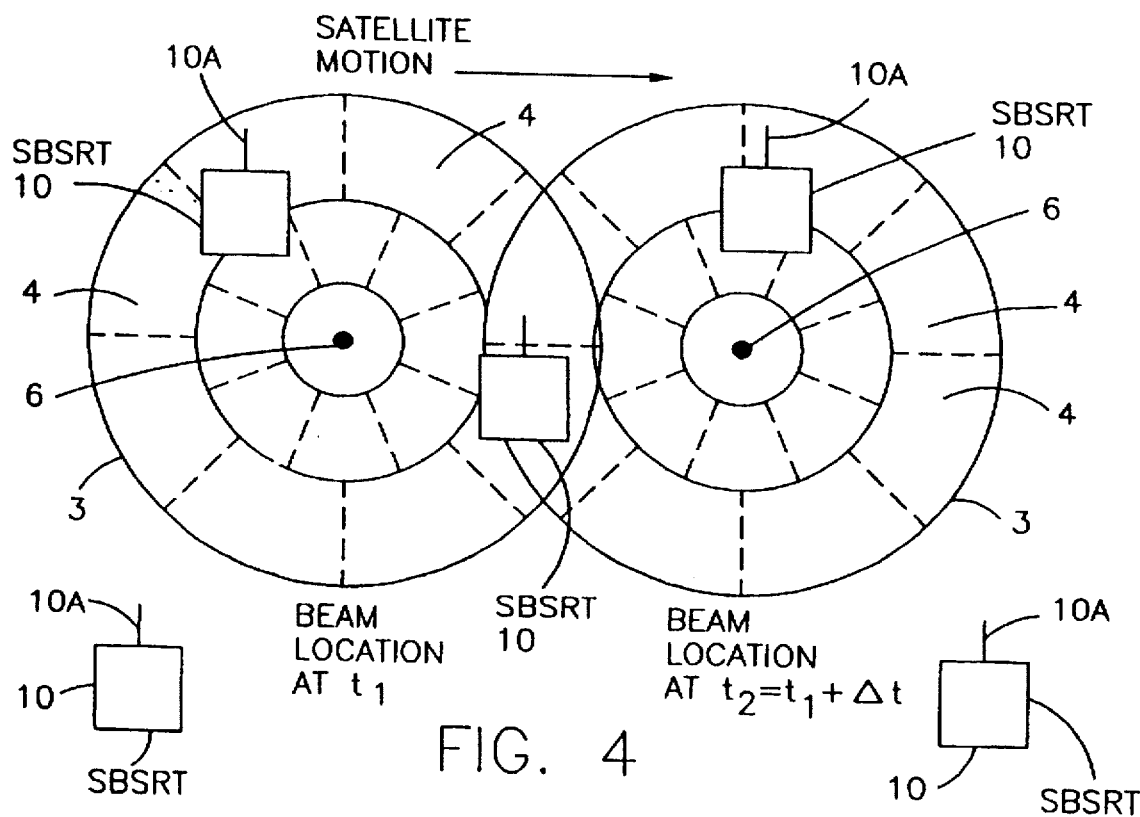
FIG. 4 illustrates a satellite beam, at two instants of time, as the beam sweeps over a plurality of SBSRTs.

Referring now to FIG. 4, one or a plurality of the SBSRTs 10 are distributed over the ground surface area at known locations. The satellite beam pattern 3 of the LEO satellite 1 moves across the pattern of SBSRTs 10. As time progresses ($t_1$ to $t_2$, where $t_2=t_1+\Delta t$), the antenna beam 3 and associated SSP 6 sweep across the earth's surface, illuminating the SBSRTs 10 in turn and causing them to appear to move from sub-beam to sub-beam.

Figure 5A:
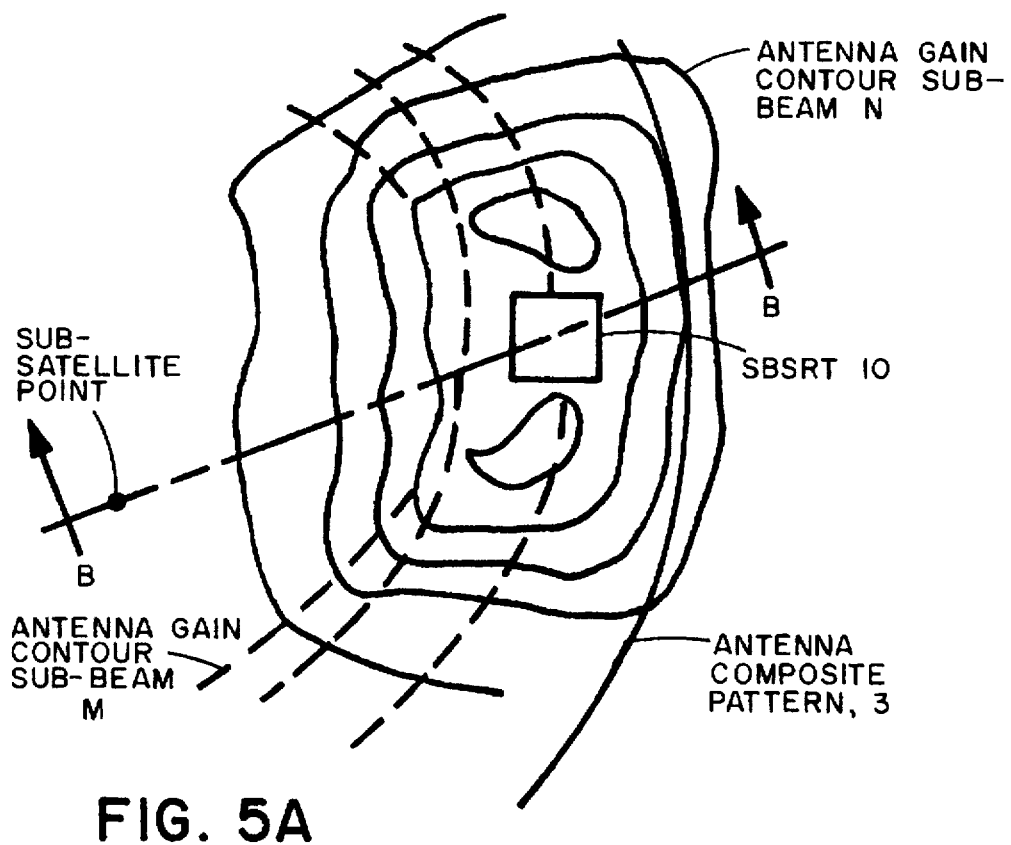
FIG. 5A illustrates exemplary antenna gain contours for two sub-beams.
Figure 5B:
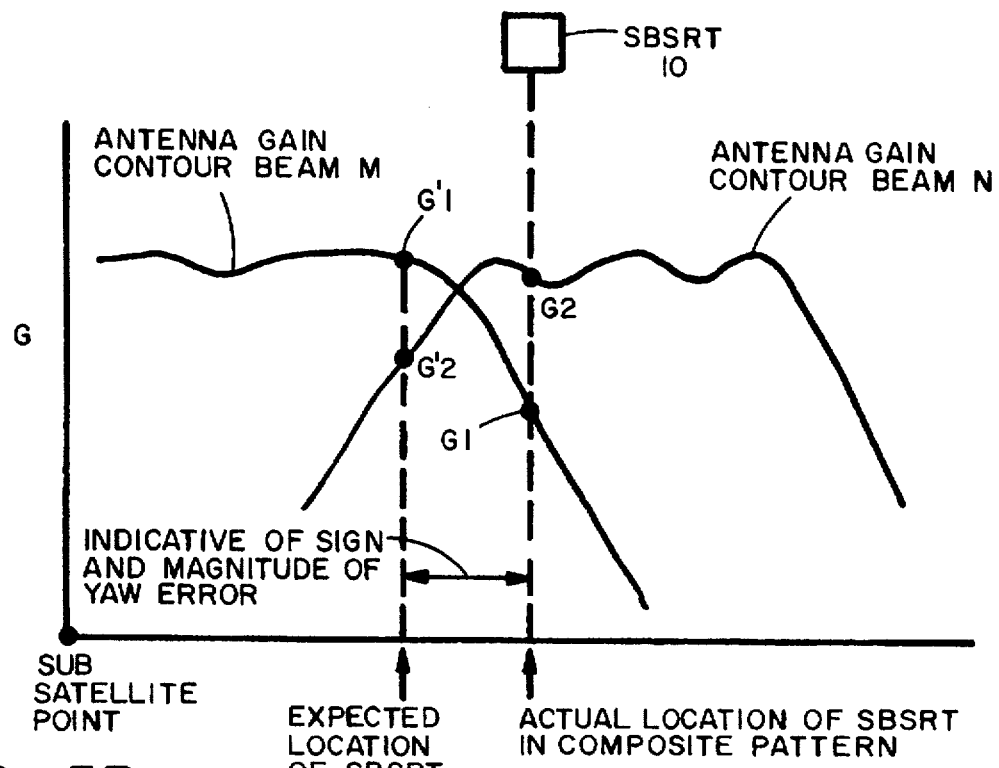
FIG. 5B is graph showing the location of a SBSRT within the antenna gain contours, as taken along the section line B—B of FIG. 5A.

Referring now also to FIGS. 5A and 5B, it is shown that, and assuming a perfect alignment of the satellite actual direction 12 and the preferred direction 5, as the satellite passes over the surface of the earth a SBSRT 10 that transmits an uplink signal will be received by the satellite 1 with a composite pattern of all sub-beams 4.

The sub-beams 4 have individual spatial variations in gain, referred to herein as the antenna gain contours g1 and g2 for sub-beams N and M, respectively. Referring particularly to FIG. 5B, it can be seen that at certain instant of time the SBSRT 10 is covered by a portion of the beam from the moving satellite 1.

Since the SBSRT 10 is fixed on the ground, and the composite satellite pattern 3 is moving with respect to the ground, the apparent antenna gain of sub-beams N and M changes with time. That is, the magnitudes of g1 and g2 can be considered to vary with time. The signal from the SBSRT 10 is received at the satellite 1 from the sub-beams N and M, and is repeated by the satellite 1 to the gateway 8 over the return feeder link 9b (FIG. 2).

Figure 6:
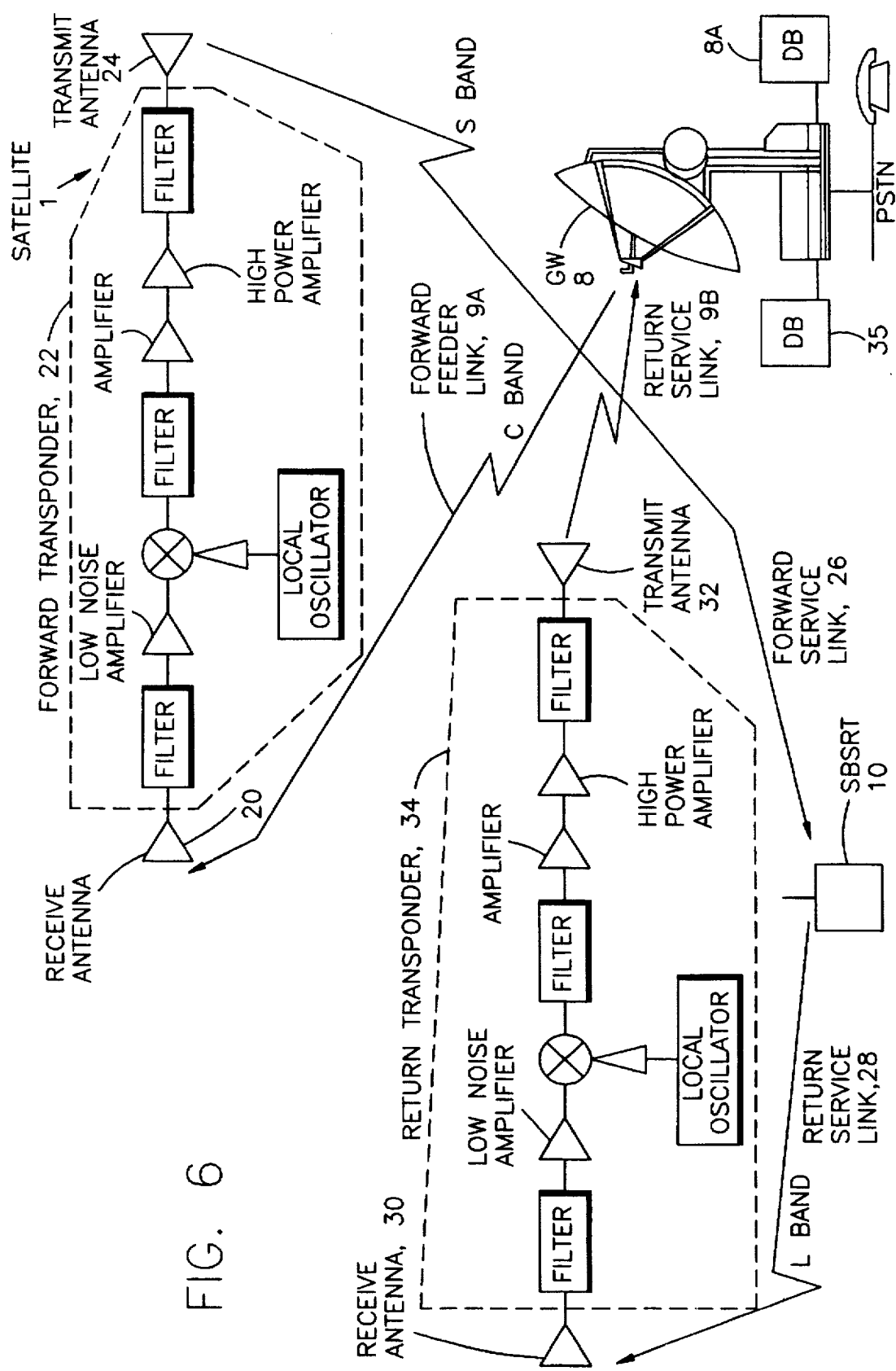
FIG. 6 is a simplified block diagram of a satellite having forward and return transponders for relaying forward and return service links, respectively, between a SBSRT and a terrestrial gateway (GW)

Referring to FIG. 6, the operation of the RF links and the repeaters is shown. Beginning with the forward feeder link 9a (e.g. a C-band link) from the GW 8 to the satellite 1, reception is made by the satellite feeder link antenna 20 and a translation in frequency is made in a forward repeater or transponder 22. The frequency translated forward signal is transmitted by the satellite antenna 24 as a forward service link 26 (e.g., S-band) for reception by the SBSRT 10. A return service link 28 (e.g. L-band) is transmitted by the SBSRT 10 to a receive antenna 30 of the satellite 1, and a translation in frequency is made in a return repeater or transponder 34. The frequency translated return signal is transmitted by the satellite antenna 32 as the return feeder link 9b for reception by the GW 8.

Figure 11:
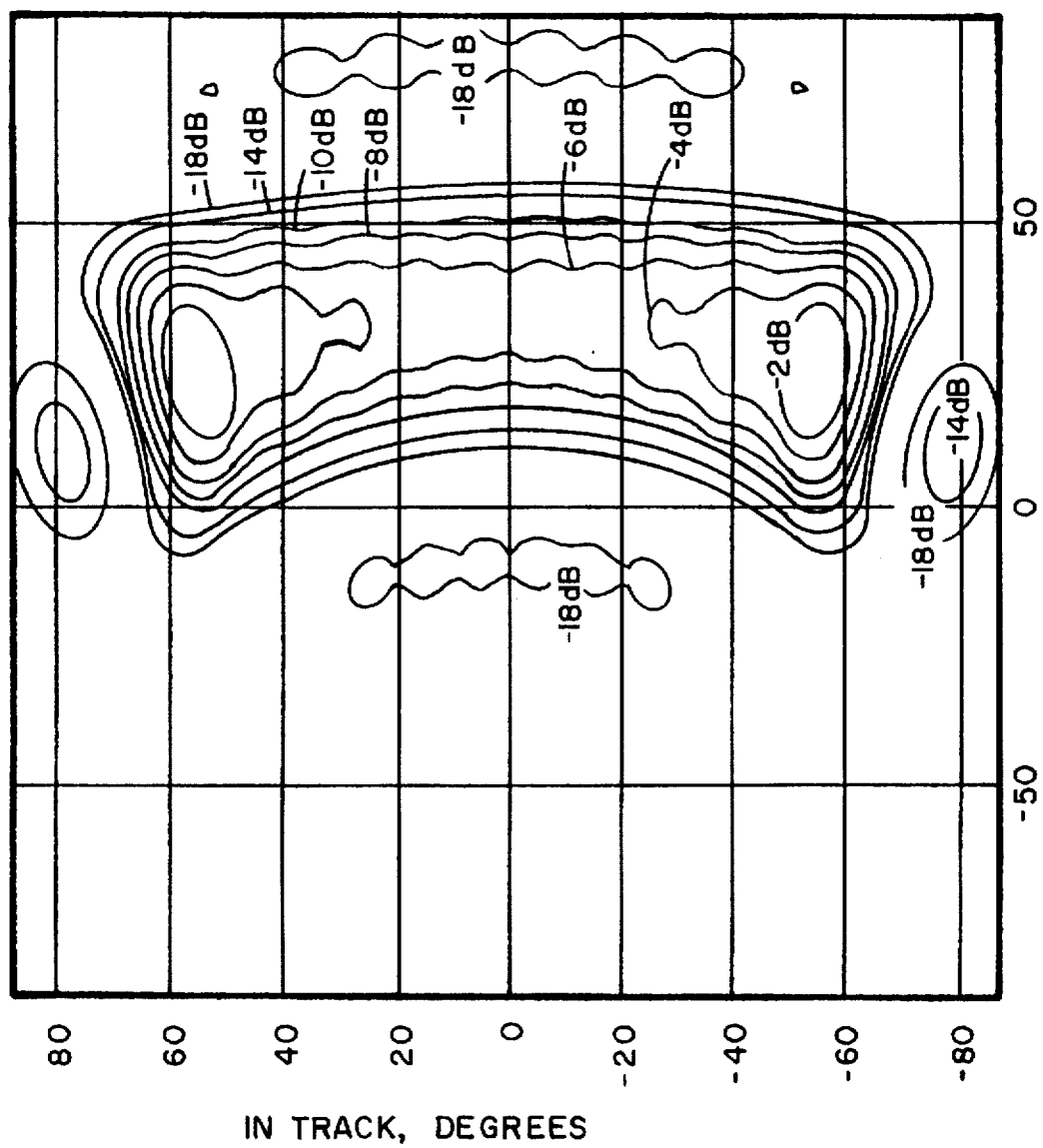
FIG. 11 is an exemplary gain contour map for a single inner beam.

The principle of operation is based on receiving a signal or signals from one or more of the SBSRTs 10 at the GW 8, determining where in the satellite's antenna pattern the SBSRT 10 is located, and relating the determined location to a database 35 of stored antenna gain contour values. The GW 8, or a Satellite Operations Control Center (SOCC) 40 or a Ground Operations Control Center (GOCC) 44 (FIG. 9), can store a gain contour map for each satellite of the constellation, or a generalized map that relates to all of the satellites. The map can be periodically updated to reflect changes in the satellite's status, such as changes in the operability of on-board linear amplifiers that generate the various sub-beams. The map or maps can be determined by calculation, based on the geometry of the phased array satellite antennas, and/or may be generated empirically by measuring the gain contour values either by testing on the ground or by performing in-orbit testing. FIG. 11 is an exemplary gain contour map for a single inner sub-beam.

The signals from a single one of the SBSRTs 10 are received by the GW 8 either singularly (e.g., from a single sub-beam 4), or as a plurality of copies from a plurality of the sub-beams 4. A mapping of fixed SBSRT 10 locations on the earth's surface into expected fixed positions in the antenna beam map results in a calculation of the angular offset between the preferred direction 5 and the apparent direction 14. That is, a determination of the yaw error angle 11 is made from the signal received from the SBSRT 10.

Referring again to FIG. 5B, based on the stored patterns of antenna gain values as a function of sub-beam gain contours, the GW 8 expects to find that the signal 28 transmitted by the SBSRT 10 into, by example, sub-beams N and M experiences satellite antenna gains of g1' and g2', it being remembered that the location of the satellite 1 is known by the GW 8 from satellite ephemerides data, while the location of the SBSRT 10 is known a priori. The gains can be determined from received signal strength or power measurements made by the GW 8. However, in actuality the GW 8 determines that the antenna gains are g1 and g2 in the sub-beams N and M, respectively. The difference in gain(s) between the expected and the measured indicates a difference between the expected and actual beam orientation with respect to the fixed SBSRT 10. This difference is then employed to derive a yaw correction that is used by the satellite attitude controller 1c (FIG. 10) to rotate the satellite 1 about the yaw axis (in this example) so as to drive the angular beam error towards zero.

Although described thus far in the context of the SBSRTs 10, it should be realized that the teaching of this invention can also employ signals received from user terminals, either mobile, handheld or fixed. That is, when establishing a connection with a user terminal, in particular, mobile and handheld terminals, the GW 8 preferably performs a position location on the user terminal using GPS positioning techniques or other suitable positioning techniques. The location of a fixed user terminal, such as one having an antenna located atop an office building or a mast, can be initially determined with great precision when the antenna is first installed. Also, whether using the SBSRTs 10 or user terminals, the GW 8 may also actively power control the terminal transmitter so as to substantially equalize the received power from each terminal. As such, the power at which a given transmitter is transmitting is also known to the GW 8.

Furthermore, it should be realized that the beam steering reference technique of this invention need not be continuously active. That is, during periods of high communications loading, and for a CDMA implementation, it may not be desirable to assign a spreading code (e.g., a Walsh code) to one of the SBSRTs 10, thereby freeing the code(s) for use by a user terminal. During periods of low communications loading the GW 18 can selectively activate one or more of the SBSRTs 10 over the forward link, assign one or Walsh codes to the SBSRTs 10, and then perform the determination of satellite attitude error (e.g., yaw error) based on transmissions from the activated one or ones of the SBSRTs 10.

The teaching of this invention can operate in one of a number of modes or methods. By example, one method employs multiple, single SBSRT 10 transmission (i.e. transmissions from several SBSRTs 10 simultaneously). Another method employs multiple SBSRT link copies, from a single SBSRT 10. A further method employs multiple copies of SBSRT link copies from multiple SBSRTs 10. These various methods are summarized in the following Table.

TABLE 1

| Method 1 | Multiple SBSRT | Single link transmission |
|---|---|---|
| Method 2 | Single SBSRT | Multiple link transmission |
| Method 3 | Multiple SBSRT | Multiple link transmission |

Figure 7A:
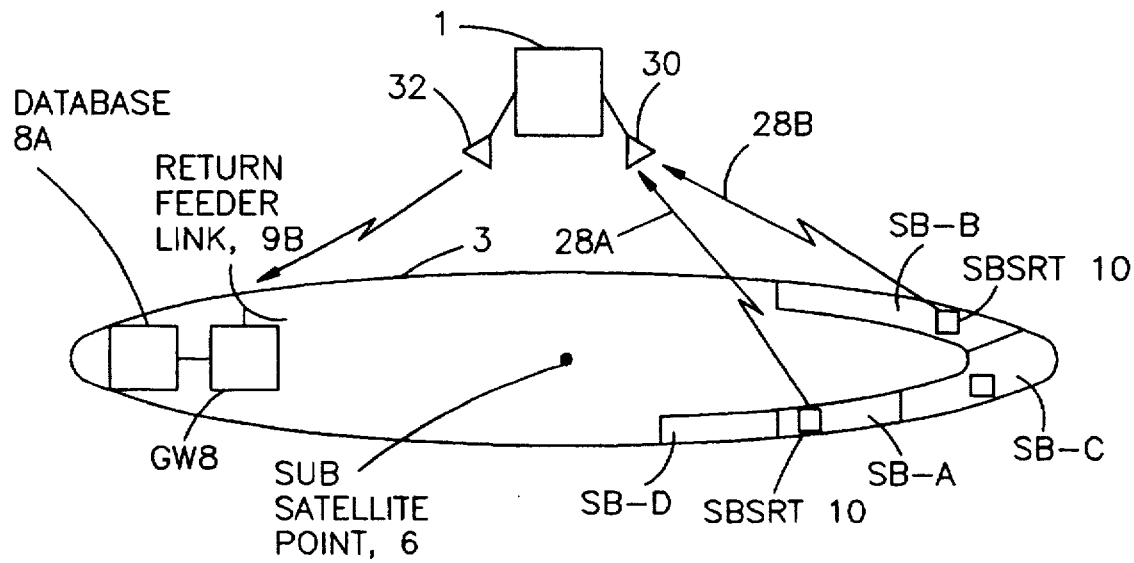
FIG. 7A is useful in describing a method of this invention wherein multiple SBSRTs (or user terminals) are used with single link transmissions.
Figure 7B:
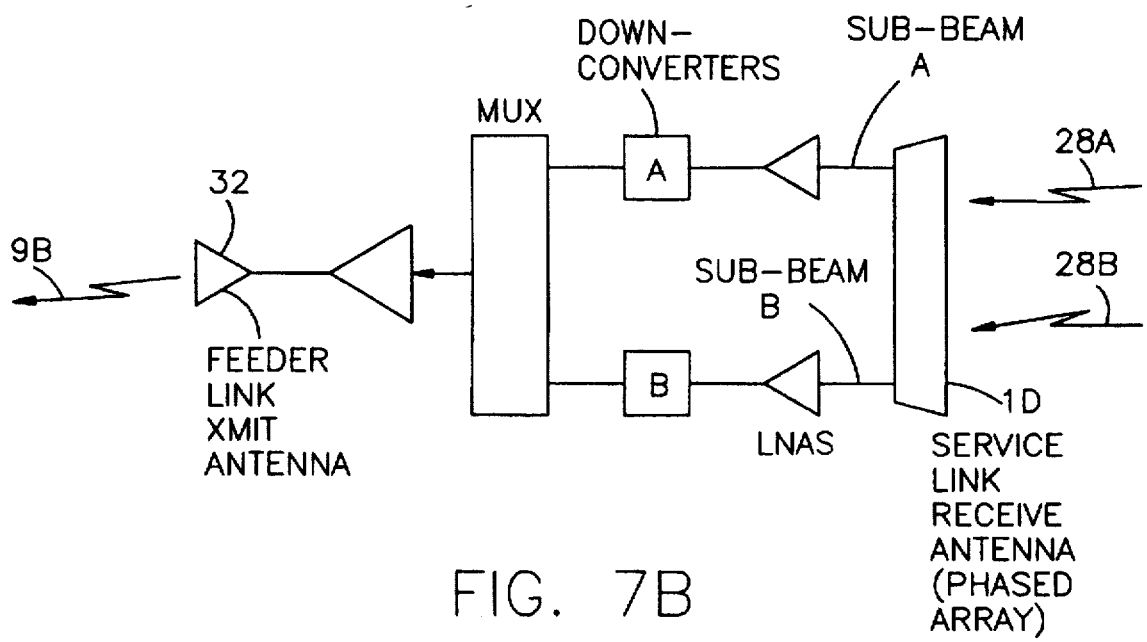
FIG. 7B is a block diagram of the satellite showing a service link receiver phased array antenna, multiple sub-beam amplifiers and down-converters, and a feeder link transmitting antenna for transmitting the service beams of FIG. 7A to a gateway.
Figure 7C:
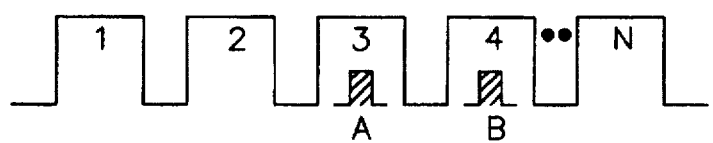
FIG. 7C shows various feeder link channels that correspond to the sub-beams wherein the SBSRTs of FIG. 7A are located.

In greater detail, and referring to FIGS. 7A–7C, Method 1 utilizes multiple SBSRTs 10 each transmitting a single return service link 28 to the GW 8 through one of the sub-beams 4. That is, a plurality of the SBSRTs 10, which are located in different sub-beams (SB) A, B, C etc., each transmit a signal to the satellite 1. The signals may be simultaneously transmitted or not. If not transmitted simultaneously, then preferably the SBSRTs 10 time tag their respective transmissions by encoding the system time into the transmission. The signals are repeated in the satellite return link transponder 30 (FIG. 6) and received at the GW 8. The received signal level, the time differences between the signals, and other link values are developed by the gateway 8 and stored in a database 8a.

Referring also to FIG. 3, the received signal gain values are developed and the apparent satellite direction 14 is determined. The preferred direction 5 is known a priori by the GW 8 and is also stored in the database 8a. The actual direction 12 is not able to be known exactly, and differs from the apparent direction 14 by the angular difference referred to previously as the knowledge uncertainty 13. Therefore, the angular difference, by example the yaw error angle 11, is calculated and stored for future use, or may be transmitted directly to the satellite attitude controller 1c (FIG. 10) for correction implementation. In either case, after correction any residual error (as considered by this invention) is the knowledge uncertainty 13.

Referring again to FIGS. 7A–7C, the SBSRTs 10 are shown transmitting signals from one or more sub-beams (e.g. SB-A and SB-B) on return service links 28a and 28b, respectively, which are then repeated on feeder link 9b. These signals can, by example, be transmitted by a repeater configured as shown in FIG. 7B, which is but one example of a suitable satellite repeater. In the example of FIG. 7B, a satellite phased array service link receiver antenna 1d receives the links 28a and 28b which are applied to SB-A and SB-B low noise amplifiers (LNAs), are then down converted, are multiplexed together, and appear as signals in the various feeder link channels (by example A and B of FIG. 7C) which correspond to the sub-beams A and B.

There are several techniques for determining the apparent direction 14 shown in FIG. 3. A first, most accurate, technique uses at least one of the SBSRTs 10, or some other transmitter having a known location on the surface of the earth, measures the gain of each transmitter as received at the GW 8, and compares the measured gain with expected values known by the GW 8 or by other ground station. A second technique uses only the knowledge of which feeder link channel(s) the SBSRT(s) 10 are located in. A third technique employs the transmission of an aggregate of communication's users, instead of an SBSRT 10, which are located in one or some of the sub-beams 4. In this latter case, by example, users which are expected to be in sub-beams A and B are found instead in, by example, sub-beams C and D. If this is found to be the case the GW 8 or other ground station is enabled to estimate the apparent direction 14 may be determined without the use of SBSRT devices.

Figure 8:
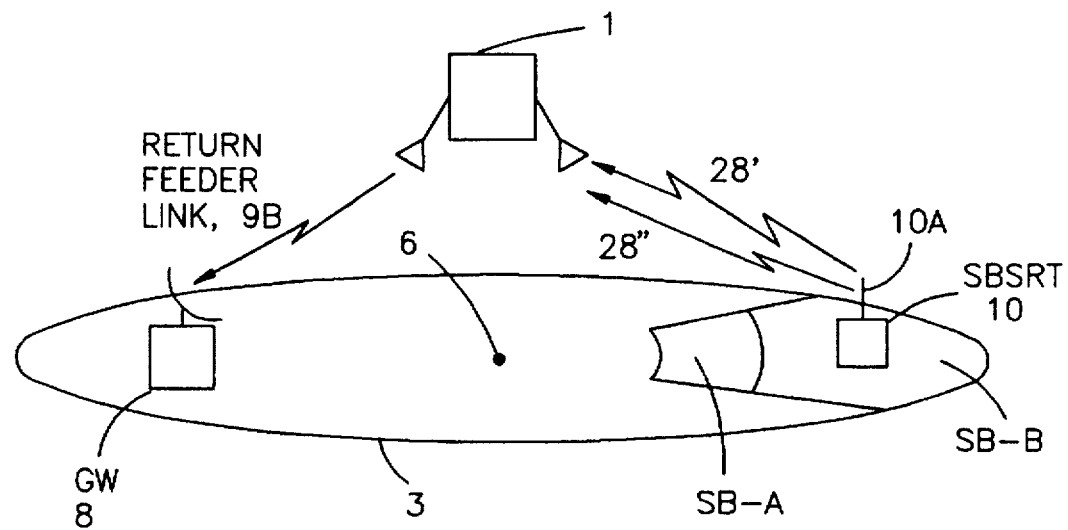
FIG. 8 is useful in describing a method of this invention wherein a single SBSRT (or user terminal) is used with multiple link transmissions.

The Method 2 referred to above, i.e., single SBSRT 10, multiple link transmission, uses a single SBSRT 10 which is transmitting one signal, but which produces multiple links. That is, the signals are automatically received in both the sub-beam A and B channels. Considering the Spread Spectrum, Code Division Multiple Access (SS-CDMA) case that is a preferred embodiment for the communications system, and referring to FIG. 8, a service link signal from a single SBSRT 10 is transmitted on multiple (e.g., two) return service links 28' and 28' using an omni-directional antenna 10a. The multiple links 28' and 28" are each received by the satellite 1, see also FIG. 7B, and resolved into input to sub-beams A and B. This results in inputs to the sub-beam A and B channels (see FIG. 7C) on the return feeder link 9b.

The signal is received at the GW 8 on two or more channels. The signal levels corresponding to g1 and g2, as shown in FIG. 5B, are then directly measured or otherwise calculated. The gain of these signals (and/or other information transmitted) is then used to determine the apparent direction 14. As in Method 1, a rough approximation of the apparent direction 14 can be made if aggregate user transmissions are used instead.

The third Method referred to above, i.e., multiple SBSRTs; multiple link transmission, can be considered a combination of Method 1 and Method 2. This Method provides the best precision of the knowledge of the error angle 11. Method 3 uses multiple SBSRTs 10 that each operate as in Method 2. That is, a plurality of SBSRTs 10 each transmit multiple links 28' and 28". For this case the multiple links are received by multiple sub-beams and the additional information as to the gains of the various links is used to develop a precise value for the apparent direction 14.

After the apparent direction 14 and the error angle(s) 11 are determined the information must be provided in some manner to the satellite 1. There are several techniques for accomplishing the delivery of the error information. Four different methods (designated A–D) are described as examples. These are referred to as: (A) individual gateway steering, real time; (B) individual gateway steering, non-real time; (C) system steering, real time; and (D) system steering, non-real time.

The first two methods (i.e., A and B) are considered together. In this case the satellite 1 is steered with the resultant error value(s) 11 from the GW 8, which determines the error value 11, transmits the information to the satellite 1 in real time (Method A), or non-real time (Method B), for further usage by the satellite attitude control system 1c shown in FIG. 10. The attitude control system 1c includes a command link receive antenna, which may be the uplink feeder link receive antenna 20 shown in FIG. 6, a command receiver 1d, and attitude controller 1e, and a suitable attitude control mechanism 1f (e.g., momentum wheels, magnetic torquers, gyros or thrusters). An optional on-board computer 1g can be included for calculating the required attitude adjustment(s) from the received information, and/or for storing the received command steering information for later use. If the computer 1g is not provided, then the command link conveys the required attitude control operations which are acted on by the attitude controller 1e. By example, and for the case of a yaw error angle determination, the attitude controller 1e and attitude control mechanism if cooperate to rotate the satellite 1 about the yaw axis (see FIG. 2) so as to reduce the yaw error angle (ideally) to zero.

For a LEO system the satellite 1 is moving over a substantial number of GWs 8. Some or all of these GWs 8 may have the command capability to command the satellite 1 and issue steering instructions to the satellite. Further, the satellite 1 (Method B) may have the computer 1g as a part of its command and control system which can accept the reference information and either store it for later use, update a steering algorithm, or otherwise utilize the reference information.

Figure 1:
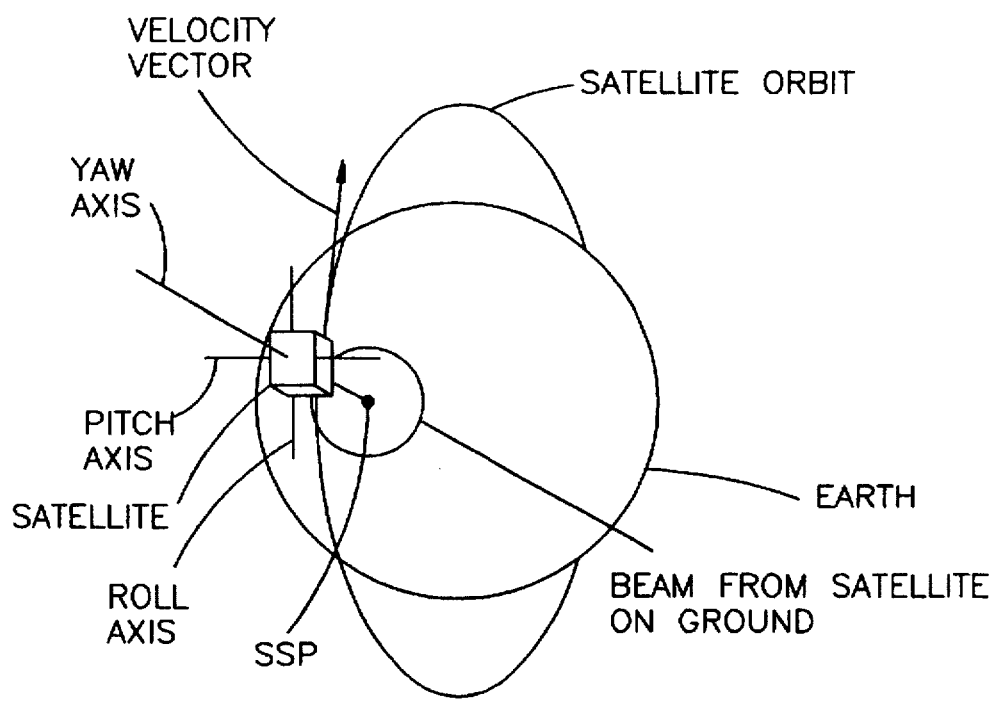
FIG. 1 is diagram that is useful in explaining the orientation of the conventional roll, pitch and yaw axes of an orbiting satellite.
Figure 10:
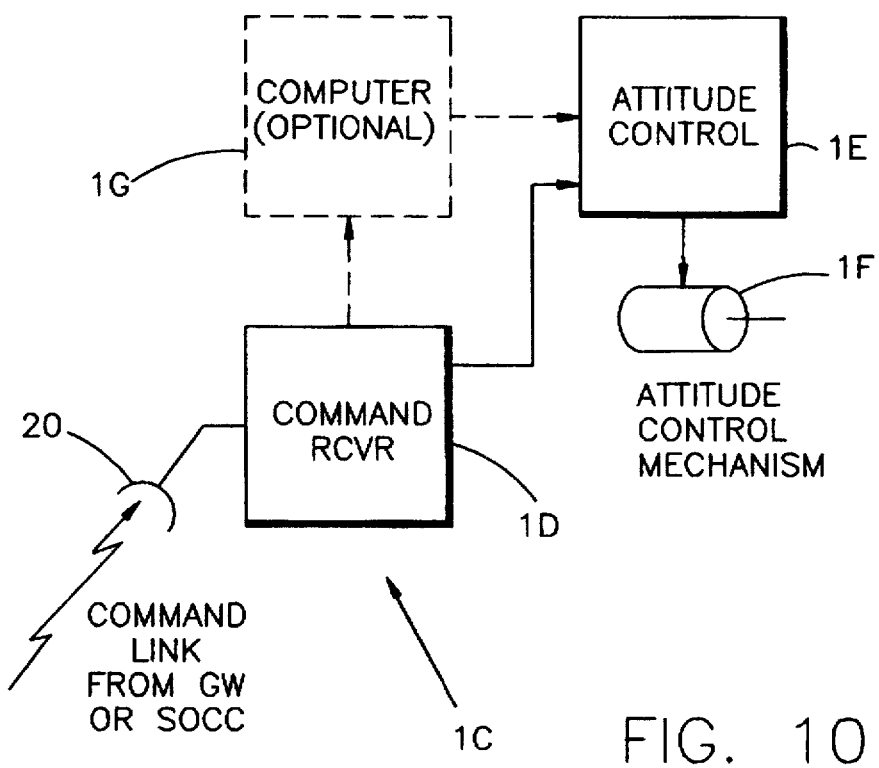
FIG. 10 is a simplified block diagram of an exemplary satellite attitude control system.

In FIG. 10 the GW 8 transmits the error signal(s) 11 or altitude control information derived from the error data to the satellite 1. The command link information is received by the command receiver 1d over the command link. The signal after reception, down conversion, decoding and processing is delivered either to the on-board computer 1g (Method B) or directly to the attitude control system 1e (Method A). In the case of the on-board computer 1g the data may be used to update a stored program for controlling the satellite 1 either in real time (Method A), or at some later time (Method B).

Alternatively, the signal can be delivered directly to the attitude controller and the pointing error corrected. Further updates or corrections are made as the satellite 1 progresses over the surface of the earth and passes over other GWs 8 and SBSRTS 10.

In either case the attitude controller 1e issues instructions to one or more types of attitude control mechanisms if to change the attitude of the satellite 1 to reduce the error angle 11.

Figure 9:
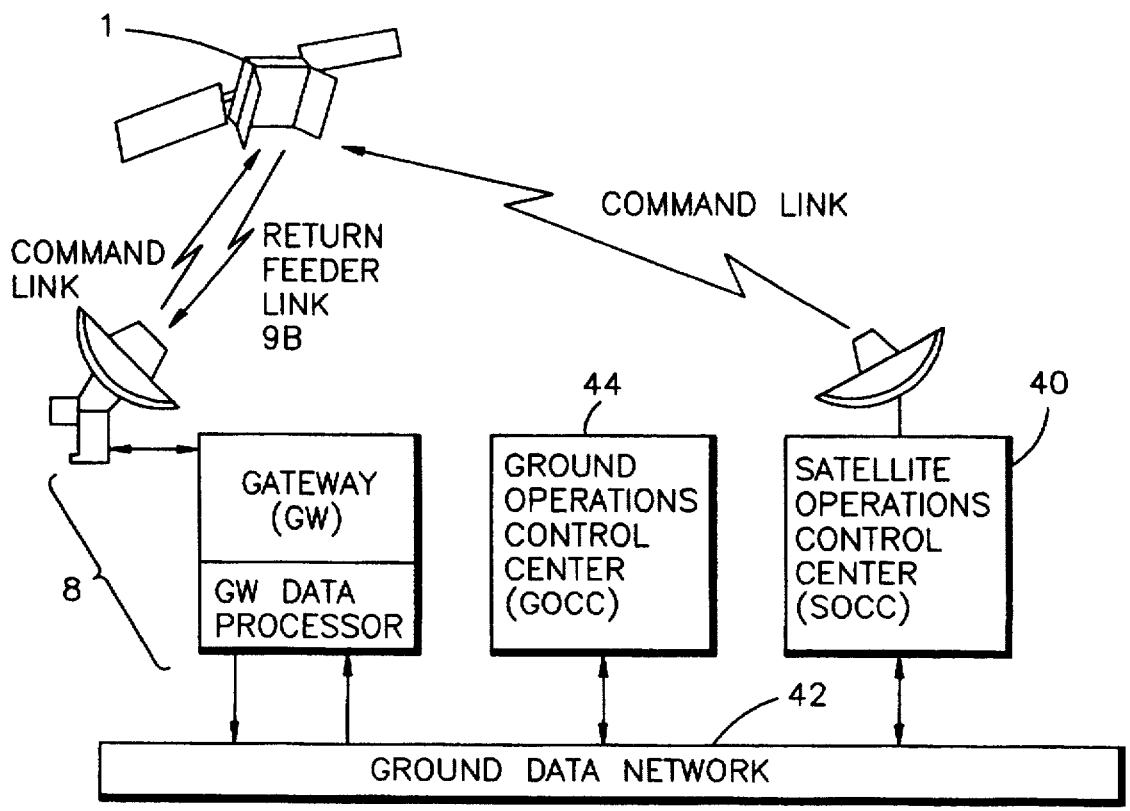
FIG. 9 is a block diagram that illustrates a gateway and a satellite operations control center (SOCC) interconnected by a terrestrial or ground data network, wherein either or both of the gateway and SOCC can transmit an attitude control command link to the satellite.

For the Methods C and D, i.e., system steering, real time and non-real time, and referring now also to FIG. 9, the satellite 1 relays the SBSRT 10 (or user terminal) transmissions to the gateway 8 over the return feeder link 9b as the satellite 1 moves across the GW 8. The signals are received by GW 8, and the error angle 11 is determined at the GW 8 as described previously. However, and in this case, the error angle 11 result is communicated to the Satellite Operations Control Center (SOCC) 40 via a terrestrial or ground data network (GDN) 42. The GDN 42 couples together a plurality of the GWs 8 (only one of which is shown in FIG. 9), the SOCC 40, and other satellite system terrestrial components, such as a Ground Operations Control Center (GOCC) 44. The resultant error angle 11 and/or other data based on the error angle is received by the SOCC 40 from the GDN 42, and is then communicated (in real time or non-real time) to the satellite 1 over the command link from the SOCC 40. The error signal is received by the command receiver 1d (FIG. 10), is down-converted, decoded and otherwise processed and formatted. The signal is then sent to the altitude controller 1e directly or indirectly via the optional on-board computer 1g for processing. The resultant information is applied to the attitude control mechanism 1f. The real time steering of Method C can be affected, or the non-real time steering of Method D can be used.

Although the attitude correction technique has been described above primarily in the context of a cooperative effort between the SBSRT(s), the satellite, and at least one ground station, it should be appreciated that all or some part of the ground station functionality can be incorporated within the satellite. By example, the satellite can store its own antenna gain contour map(s), can determine the gain of the signal received from the SBSRT or user terminal, can calculate its attitude error (e.g., yaw error), and can then take corrective action.

Thus, while the invention has been particularly shown and described with respect to preferred embodiments thereof, it will be understood by those skilled in the art that changes in form and details may be made therein without departing from the scope and spirit of the invention.

What is claimed is:

1. In a satellite communication system comprising at least one satellite having an antenna that generates a moving beam pattern on the surface of the earth, the beam pattern being comprised of a plurality of sub-beams, a method for determining an attitude correction signal for the satellite comprising the steps of:

providing at least one reference transmitter at a known location on the surface of the earth;

transmitting at least one signal from the at least reference transmitter into at least one of the sub-beams;

receiving the at least one signal with the satellite antenna and transponding the received at least one signal to a ground station;

receiving the transponded at least one signal with the ground station;

determining a gain of the received at least one signal;

comparing the determined gain to a gain expected to be received based on a predetermined knowledge of a spatial variation in gain of the satellite antenna; and determining a difference between the determined gain and the expected gain to derive a correction signal indicative of an attitude error of the satellite.

2. A method as set forth in claim 1 and further comprising the steps of:

transmitting the correction signal from the ground station to the satellite; and correcting the attitude of the satellite in accordance with the correction signal.

3. A method as set forth in claim 1 and further comprising the steps of:

transmitting the correction signal from the ground station to a second ground station;

transmitting the correction signal from the second ground station to the satellite; and correcting the attitude of the satellite in accordance with the correction signal.

4. A method as set forth in claim 1 wherein the step of transmitting includes a step of transmitting a plurality of signals from one reference transmitter.

5. A method as set forth in claim 1 wherein the step of transmitting includes a step of transmitting a plurality of signals from a plurality of reference transmitters.

6. A method as set forth in claim 1 wherein the step of transmitting includes a step of transmitting one signal from individual ones of a plurality of reference transmitters.

7. A method as set forth in claim 1, wherein the satellite has a preferred direction of travel over the surface of the earth, wherein at least one error angle exists such that the satellite travels in an actual direction that differs from the preferred direction, and wherein the step of determining determines an apparent direction of travel that differs from the actual direction of travel by an angle related to a knowledge uncertainty as to the satellite attitude.

8. A method as set forth in claim 1 wherein the correction signal has a value that is a function of a yaw error angle of the satellite, and further comprising the steps of:

transmitting the correction signal to the satellite; and correcting the attitude of the satellite in accordance with the correction signal by rotating the satellite about the yaw axis so as to reduce a magnitude of the yaw error angle.

9. A method as set forth in claim 1 wherein the correction signal has a value that is a function of at least one axial misalignment error of the satellite, and further comprising the steps of:

transmitting the correction signal to the satellite; and correcting the at least one axial misalignment error of the satellite in accordance with the correction signal.

10. A method as set forth in claim 1 wherein the correction signal has a value that is a function of at least one axial misalignment error of the satellite antenna, and further comprising the steps of:

transmitting the correction signal to the satellite; and correcting the at least one axial misalignment error of the satellite antenna in accordance with the correction signal.

11. A method as set forth in claim 1, wherein the step of transmitting at least one signal from the at least one reference transmitter transmits a spread spectrum, code division multiple access signal, wherein the step of transponding the received at least one signal to a ground station transmits the spread spectrum, code division multiple access signal into at least one feeder link channel, and wherein the step of receiving the transponded at least one signal with the ground station receives the transponded spread spectrum, code division multiple access signal from the at least one feeder link channel.

12. In a satellite communication system comprising at least one satellite having an antenna that generates a moving beam pattern on the surface of the earth, the beam pattern being comprised of a plurality of sub-beams, a satellite attitude correction system comprising:

at least one reference transmitter at a known location on the surface of the earth;

means for transmitting at least one signal from the at least reference transmitter into at least one of the sub-beams;

means for receiving the at least one signal from the satellite antenna and for transponding the received at least one signal to a ground station;

means for receiving the transponded at least one signal with the ground station;

means for determining a gain of the received at least one signal and for comparing the determined gain to a gain expected to be received based on a predetermined knowledge of a spatial variation in gain of the satellite antenna; and means for determining a difference between the determined gain and the expected gain to derive a correction signal indicative of an attitude error of the satellite.

13. The satellite attitude correction system of claim 12, and further comprising:

means for transmitting the correction signal from the ground station to the satellite; and means in said satellite for correcting the attitude of the satellite in accordance with the correction signal.

14. The satellite attitude correction system of claim 12, and further comprising:

means for transmitting the correction signal from the ground station to a second ground station;

means for transmitting the correction signal from the second ground station to the satellite; and means in said satellite for correcting the attitude of the satellite in accordance with the correction signal.

15. The satellite attitude correction system of claim 12, wherein said transmitting means transmits a plurality of signals from one reference transmitter.

16. The satellite attitude correction system of claim 12, wherein said transmitting means transmits a plurality of signals from a plurality of reference transmitters.

17. The satellite attitude correction system of claim 12, wherein said transmitting means transmits one signal from individual ones of a plurality of reference transmitters.

18. The satellite attitude correction system of claim 12, wherein the satellite has a preferred direction of travel over the surface of the earth, wherein at least one error angle exists such that the satellite travels in an actual direction that differs from the preferred direction, and wherein said determining means determines an apparent direction of travel that differs from the actual direction of travel by an angle related to a knowledge uncertainty as to the satellite attitude.

19. The satellite attitude correction system of claim 12, wherein the correction signal has a value that is a function of a yaw error angle of the satellite, and further comprising:

means for transmitting the correction signal to the satellite; and means in said satellite for correcting the attitude of the satellite in accordance with the correction signal by rotating the satellite about the yaw axis so as to reduce a magnitude of the yaw error angle.

20. The satellite attitude error correction system as set forth in claim 12 wherein the correction signal has a value that is a function of at least one axial misalignment error of the satellite, and further comprising:

means for transmitting the correction signal to the satellite; and means in said satellite for correcting the at least one axial misalignment error of the satellite in accordance with the correction signal.

21. The satellite attitude error correction system as set forth in claim 12 wherein the correction signal has a value that is a function of at least one axial misalignment error of the satellite antenna, and further comprising:

means for transmitting the correction signal to the satellite; and means in said satellite for correcting the at least one axial misalignment error of the satellite antenna in accordance with the correction signal.

22. The satellite attitude correction system of claim 12, wherein said transmitting means transmits a spread spectrum, code division multiple access signal, wherein said transponding means includes means for transmitting the spread spectrum, code division multiple access signal into at least one feeder link channel, and wherein said ground station includes means for receiving the transponded spread spectrum, code division multiple access signal from the at least one feeder link channel.

23. In a satellite communication system comprising at least one satellite having a steerable antenna that generates a moving beam pattern on the surface of the earth, the beam pattern being comprised of a plurality of sub-beams, a method for determining an antenna pointing correction signal for the satellite comprising the steps of:

providing at least one reference transmitter at a known location on the surface of the earth;

transmitting at least one signal from the at least reference transmitter into at least one of the sub-beams;

receiving the at least one signal with the satellite antenna and transponding the received at least one signal to a ground station;

receiving the transponded at least one signal with the ground station;

determining a gain of the received at least one signal;

comparing the determined gain to a gain expected to be received based on a predetermined knowledge of a spatial variation in gain of the satellite antenna; and determining a difference between the determined gain and the expected gain to derive a correction signal indicative of a pointing error of the satellite antenna.

24. In a satellite communication system comprising at least one satellite having an antenna that generates a moving beam pattern on the surface of the earth, the beam pattern being comprised of a plurality of sub-beams, a method for determining beam pattern correction signal for the satellite comprising the steps of:

providing at least one reference transmitter at a known location on the surface of the earth;

transmitting at least one signal from the at least reference transmitter into at least one of the sub-beams;

receiving the at least one signal with the satellite antenna;

comparing a gain of the received at least one signal to a gain expected to be received based on a predetermined knowledge of a spatial variation in gain of the satellite antenna; and determining a beam pattern correction signal in accordance with a difference between the actual gain and the expected gain.

25. A method as set forth in claim 24 wherein the step of receiving the at least one signal with the satellite includes a step of retransmitting the received at least one signal; and wherein the steps of comparing and determining are executed by at least one ground station.

26. A method as set forth in claim 25 and further comprising the steps of:

transmitting the correction signal from the ground station to the satellite; and correcting the beam pattern in accordance with the correction signal.

27. A method as set forth in claim 25 and further comprising the steps of:

storing the correction;

subsequently transmitting the stored correction signal from the same or a different ground station to the satellite; and correcting the beam pattern in accordance with the correction signal.

28. A method as set forth in claim 24 wherein the steps of comparing and determining are executed by the satellite.

29. In a satellite communication system comprising at least one satellite having an antenna that generates a moving beam pattern on the surface of the earth, the beam pattern being comprised of a plurality of sub-beams, a method for determining beam pattern correction signal for the satellite comprising the steps of:

providing at least one reference transmitter at a known location on the surface of the earth;

transmitting at least one signal from the at least reference transmitter into at least one of the sub-beams;

receiving the at least one signal with the satellite antenna;

comparing a gain of the received at least one signal to a gain expected to be received based on a predetermined knowledge of a spatial variation in gain of the satellite antenna;

determining a beam pattern correction signal in accordance with a difference between the actual gain and the expected gain; and correcting the beam pattern in accordance with the correction signal and in accordance with information obtained from at least one attitude sensor means carried by said satellite.

30. A method as set forth in claim 29 wherein the step of receiving the at least one signal with the satellite includes a step of retransmitting the received at least one signal; and wherein the steps of comparing and determining are executed by at least one ground station.

31. A method as set forth in claim 30, wherein the step of correcting includes an initial step of transmitting the correction signal from the at least one ground station to the satellite.

32. A method as set forth in claim 30, wherein the step of correcting includes the initial steps of storing the correction signal on the ground; and subsequently transmitting the correction signal from a ground station to the satellite.

33. In a satellite communication system comprising at least one satellite having an antenna that generates a moving beam pattern on the surface of the earth, the beam pattern being comprised of a plurality of sub-beams, a method for determining beam pattern correction signal for the satellite comprising the steps of:

providing at least one transmitter at a location on the surface of the earth;

transmitting at least one signal from the at least transmitter into at least one of the sub-beams using a predetermined access technique;

receiving the at least one signal with the satellite antenna;

comparing a gain of the received at least one signal to a gain expected to be received based on a predetermined knowledge of a spatial variation in gain of the satellite antenna; and determining a beam pattern correction signal in accordance with a difference between the actual gain and the expected gain.

34. A method as set forth in claim 33 wherein the predetermined access technique is comprised of a code division, multiple access technique.

35. A method as set forth in claim 33 wherein the predetermined access technique is comprised of a time division, multiple access technique.

36. A method as set forth in claim 33 wherein the predetermined access technique is comprised of a frequency division, multiple access technique.

37. A method as set forth in claim 33 wherein the transmitter forms a portion of a user terminal transceiver.

38. A method as set forth in claim 37 wherein the step of receiving the at least one signal with the satellite includes a step of retransmitting the received at least one signal; wherein the steps of comparing and determining are executed by at least one ground station that receives the retransmitted signal; and wherein the at least one ground station is connected to a terrestrial communications system for coupling the user terminal to the terrestrial communications system.

* * * * *